United States Patent
Hampden-Smith et al.

(10) Patent No.: US 12,435,009 B2
(45) Date of Patent: Oct. 7, 2025

(54) MONOLITHIC CERAMIC BODY AND ASSEMBLY

(71) Applicant: SAINT-GOBAIN CERAMICS & PLASTICS, INC., Worcester, MA (US)

(72) Inventors: Mark Hampden-Smith, Chelmsford, MA (US); Francesca Mirri, Acton, MA (US); Michael McGahan, Middletown, RI (US); Bojana Lante, Northborough, MA (US); Emmanuel Simadiris, Anaheim, CA (US); Michael Sender, Somerville, MA (US); Paul W. Rehrig, Sterling, MA (US); Patrick Van Nuoi Nguyen, Cavaillon (FR); Stephen Lee Dahar, Solon, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 397 days.

(21) Appl. No.: 16/862,245

(22) Filed: Apr. 29, 2020

(65) Prior Publication Data

US 2020/0339481 A1 Oct. 29, 2020

Related U.S. Application Data

(60) Provisional application No. 62/840,256, filed on Apr. 29, 2019.

(51) Int. Cl.
*C04B 38/00* (2006.01)
*C04B 35/10* (2006.01)
(Continued)

(52) U.S. Cl.
CPC .......... *C04B 38/0016* (2013.01); *C04B 35/10* (2013.01); *C04B 35/195* (2013.01);
(Continued)

(58) Field of Classification Search
CPC .......................... C04B 2235/94; C04B 38/007
See application file for complete search history.

(56) References Cited

U.S. PATENT DOCUMENTS

| | | | |
|---|---|---|---|
| 4,743,578 A | 5/1988 | Davidson | |
| 5,456,833 A | 10/1995 | Butcher | |

(Continued)

FOREIGN PATENT DOCUMENTS

| | | | |
|---|---|---|---|
| CN | 1823211 A | 8/2006 | |
| CN | 103080047 A | 5/2013 | |

(Continued)

OTHER PUBLICATIONS

Villars, P.; "β-SiC, 3C (SiC 3C) Crystal Structure", Inorganic Solid Phases, SpringerMaterials; 2016, p. 1-5; Accessed at https://materials.springer.com/isp/crystallographic/docs/sd_1927164.*

(Continued)

*Primary Examiner* — Humera N. Sheikh
*Assistant Examiner* — Julia L Rummel
(74) *Attorney, Agent, or Firm* — Abel Schillinger, LLP; Adrian Lawrence

(57) ABSTRACT

A monolithic ceramic body can comprise a first portion comprising a plurality of pores defining an interconnected network of pores, and a second portion integrally formed with the first portion and defining at least a portion of a perimeter surface of the monolithic ceramic body, wherein the second portion can include at least one complementary engagement structure.

In another embodiment, a porous ceramic assembly can comprise at least two of the monolithic ceramic bodies which are coupled to each other by a first complementary engagement structure and a second complementary engagement structure.

16 Claims, 8 Drawing Sheets

(51) Int. Cl.
*C04B 35/195* (2006.01)
*C04B 35/622* (2006.01)
*C04B 38/06* (2006.01)

(52) U.S. Cl.
CPC ........ *C04B 35/622* (2013.01); *C04B 38/0054* (2013.01); *C04B 38/0058* (2013.01); *C04B 38/06* (2013.01); *C04B 2235/3217* (2013.01); *C04B 2235/3481* (2013.01); *C04B 2235/665* (2013.01)

(56) References Cited

U.S. PATENT DOCUMENTS

| | | | | |
|---|---|---|---|---|
| 5,958,831 | A * | 9/1999 | Prin | C04B 41/009 |
| | | | | 502/200 |
| 7,074,479 | B2 | 7/2006 | Rogowski | |
| 7,503,955 | B2 | 3/2009 | Bardon | |
| 8,475,557 | B2 | 7/2013 | Boger | |
| 8,575,513 | B2 | 11/2013 | Abdo | |
| 8,591,622 | B2 | 11/2013 | Gallagher | |
| 10,029,949 | B2 | 7/2018 | Schubert | |
| 10,532,303 | B2 | 1/2020 | Gibson | |
| 2003/0180518 | A1 | 9/2003 | Rogowski | |
| 2004/0152593 | A1* | 8/2004 | Cutler | B01J 35/10 |
| | | | | 502/251 |
| 2005/0159292 | A1* | 7/2005 | Pham | C04B 38/0032 |
| | | | | 502/178 |
| 2006/0191245 | A1* | 8/2006 | Bardon | F01N 3/0222 |
| | | | | 55/523 |
| 2006/0249061 | A1* | 11/2006 | Nowak | F23D 1/00 |
| | | | | 110/260 |
| 2008/0131665 | A1 | 6/2008 | Suyama | |
| 2009/0239740 | A1 | 9/2009 | Ohno | |
| 2009/0252906 | A1 | 10/2009 | Higuchi | |
| 2010/0173770 | A1* | 7/2010 | Waller | B01J 20/3007 |
| | | | | 502/100 |
| 2011/0129640 | A1 | 6/2011 | Beall | |
| 2015/0096266 | A1* | 4/2015 | Divine | B29C 70/688 |
| | | | | 53/558 |
| 2016/0038866 | A1 | 2/2016 | Gibson | |
| 2016/0297097 | A1 | 10/2016 | Riman | |
| 2017/0022111 | A1 | 1/2017 | Jarvis | |
| 2017/0050241 | A1 | 2/2017 | Thomas | |
| 2017/0152163 | A1 | 6/2017 | Chaplin | |
| 2017/0252737 | A1* | 9/2017 | Kuki | B28B 1/24 |

FOREIGN PATENT DOCUMENTS

| | | |
|---|---|---|
| CN | 106242585 A | 12/2016 |
| CN | 106337158 A | 1/2017 |
| CN | 106735176 | 5/2017 |
| EP | 3335781 A1 | 6/2018 |
| JP | S62114658 A | 5/1987 |
| JP | H11190593 A | 7/1999 |
| JP | 2009256187 A | 11/2009 |
| RU | 2668107 C1 | 9/2018 |

OTHER PUBLICATIONS

International Search Report & Written Opinion dated Aug. 12, 2020 with regard to International Application No. PCT/US2020/030531.
Muth, et al. "Architected cellular ceramics with tailored stiffness via direct foam writing", PNAS Feb. 21, 2017, 114 (8) 1832-1837.

* cited by examiner

MONOLITHIC CERAMIC BODY AND ASSEMBLY

CROSS-REFERENCE TO RELATED APPLICATION

This application claims priority under 35 U.S.C. § 119(e) to U.S. Provisional Patent Application No. 62/840,256, entitled "MONOLITHIC CERAMIC BODY AND ASSEMBLY," by Mark HAMPDEN-SMITH et al., filed Apr. 29, 2019, which is assigned to the current assignee hereof and is incorporated herein by reference in its entirety.

FIELD OF THE DISCLOSURE

The present disclosure relates to a monolithic ceramic body comprising a plurality of pores defining an interconnected network and an assembly comprising at least two of the monolithic ceramic bodies coupled to each other by a complementary engagement structure.

BACKGROUND

The manufacturing of complex three dimensional ceramic bodies comprising a defined porous structure of interconnected pores can find applications in a wide range of fields, for example, in applications involving filtration, insulation, or for catalyst carriers.

There is a need for preparing ceramic bodies with a controlled porous structure, such that the pore structure can be made suitable for any specific need and application.

SUMMARY

In one embodiment, a monolithic ceramic body can comprise a first portion comprising a plurality of pores defining an interconnected network of pores extending through a portion of the monolithic ceramic body; a second portion integrally formed with the first portion and defining at least a portion of a perimeter surface of the monolithic ceramic body, wherein the second portion includes at least one complementary engagement structure.

In another embodiment, a monolithic ceramic body can comprise a first portion comprising a plurality of pores defining an interconnected network of pores extending through a portion of the monolithic ceramic body; a second portion integrally formed with the first portion and defining at least a portion of a perimeter surface of the monolithic ceramic body; wherein the monolithic ceramic body comprises a non-polygonal two-dimensional shape as viewed in a plane defined by a length and width of the body.

In a further embodiment, a monolithic ceramic body can comprise a first portion comprising a ceramic matrix structure defining a plurality of pores defining an interconnected network of pores extending through the ceramic body; a second reinforcing portion integrally formed with the first portion and extending through the first portion and having at least one dimension of length, width or thickness that is greater than a corresponding dimension of the ceramic matrix.

In one embodiment, a porous ceramic assembly can comprise at least one first monolithic ceramic body comprising: a first portion comprising a plurality of pores defining an interconnected network of pores extending through a portion of the monolithic ceramic body; and a second portion integrally formed with the first portion and defining at least a portion of a perimeter surface of the monolithic ceramic body, wherein the second portion includes a first complementary engagement structure; and at least one second monolithic ceramic body comprising: a second complementary engagement structure, wherein the first monolithic ceramic body and second monolithic ceramic body are coupled to each other via the first complementary engagement structure and second complementary engagement structure.

In yet a further embodiment, a process for preparing a monolithic ceramic body, can comprise: forming a monolithic green body by an additive manufacturing process, wherein the green body comprises ceramic particles and a binder; removing the binder of the green body by heat treatment; and sintering the green body at a temperature of at least 700° C. to obtain the ceramic body, wherein the ceramic body comprises a first portion comprising a plurality of pores defining an interconnected network of pores; a second portion integrally formed with the first portion and defining at least a portion of a perimeter surface of the monolithic ceramic body, wherein the second portion includes at least one complementary engagement structure.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Various embodiments of the present disclosure will now be described, by way of example only, with reference to the accompanying drawings.

In one embodiment, the present disclosure relates to a monolithic ceramic body comprising a plurality of pores defining an interconnected network of pores as a first portion. The monolithic ceramic body further comprises a second portion integrally formed with the first portion, wherein the second portion can include at least one complementary engagement structure. The engagement structure may allow to couple at least two of the monolithic ceramic bodies to each other or to secure the monolithic ceramic body to a larger structure. The monolithic ceramic body of the present disclosure can be suitable for a large variety of applications wherein an interconnected open pore structure is required or of advantage. Non-limiting examples can be a filter, a carrier structure for a catalyst, an insulation material, an electrode material, a scaffold for a battery, or a bioscaffold.

Figure 1:
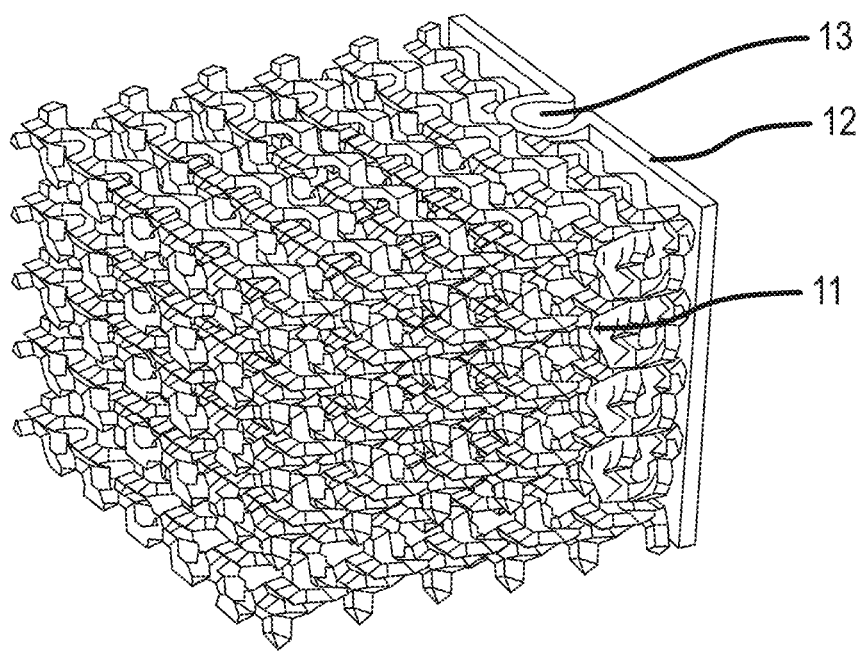
FIG. 1 includes an illustration of a perspective view of a monolithic ceramic body according to one embodiment.

FIG. 1 illustrates an embodiment of a monolithic ceramic body, wherein a first portion contains a plurality of pores forming an interconnected network (11), and a second portion (12) is positioned at one side surface of the first portion, wherein the second portion contains a complementary engagement structure (13) in form of a non-polygonal indent.

As used herein, the term complementary engagement structure means that it is either a protrusion (male structure unit) or an indent (female structure unit), wherein the protrusion and indent have a matching structure to each other and can couple, for example, two monolithic ceramic bodies to each other, or can attach the monolithic ceramic body to a holding construction. In one aspect, the protrusion can be a first complementary engagement structure, and the indent can be a second complementary engagement structure. In a particular aspect, the protrusion and the indent can have a non-polygonal structure, similar like the interconnecting units (often called tabs and blanks) of a jigsaw puzzle.

Figure 2:
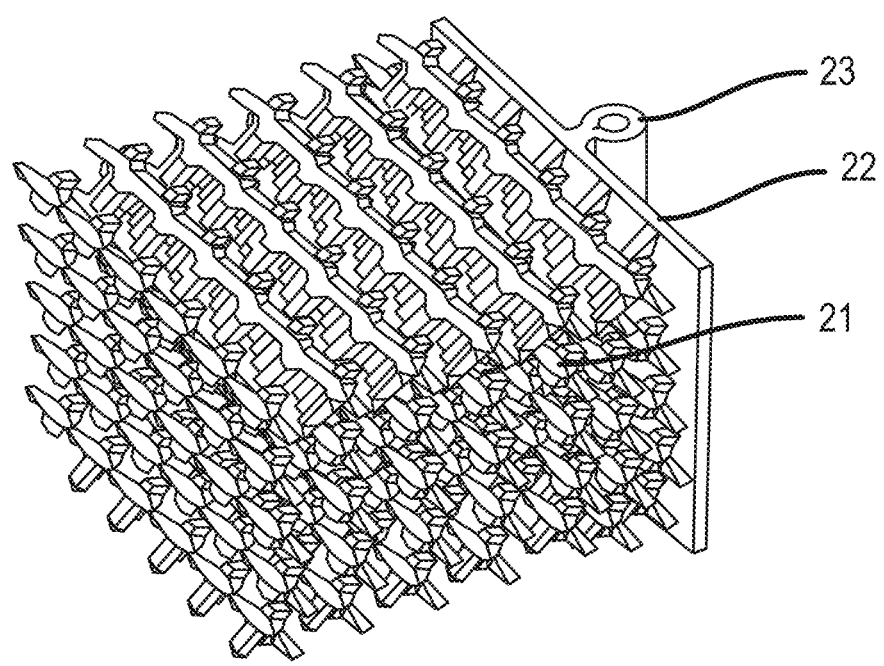
FIG. 2 includes an illustration of a perspective view of a monolithic ceramic body according to one embodiment.

FIG. 2 illustrates a similar structure as FIG. 1, wherein the second portion (22) is positioned on one side surface of the first portion comprising a plurality of interconnected pores (21) and the second portion (22) includes a complementary engagement structure (23) with a non-polygonal shape of a protrusion.

Figure 3:
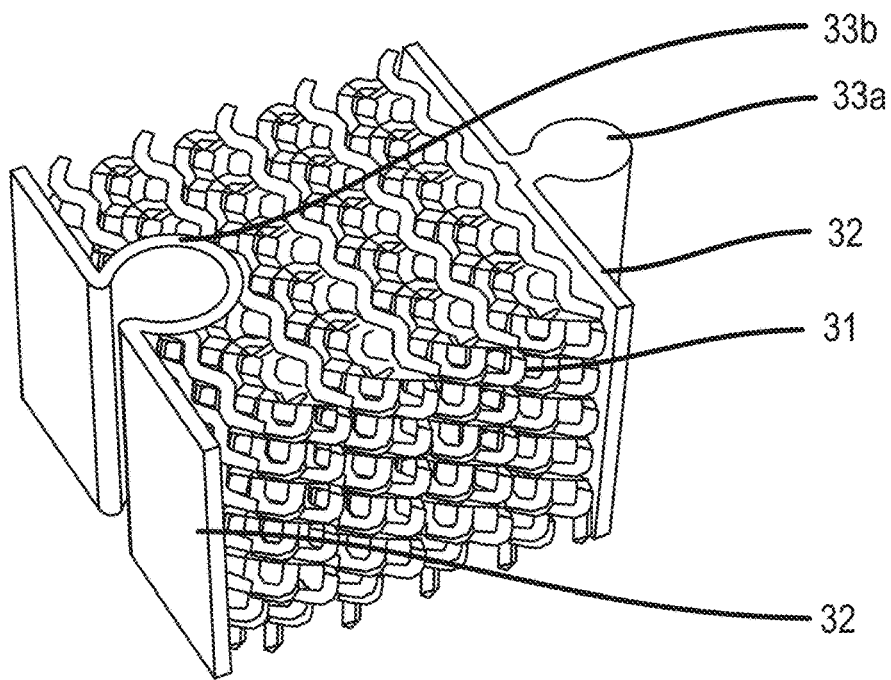
FIG. 3 includes an illustration of a perspective view monolithic ceramic body according to one embodiment.

FIG. 3 illustrates an embodiment, wherein the porous structure (31) of the first portion contains on opposite side surfaces a second portion (32), and one second portion includes a protrusion as a complementary engagement structure (33a) and the other second portion includes an indent as a complementary engagement structure (33b).

Figure 4:
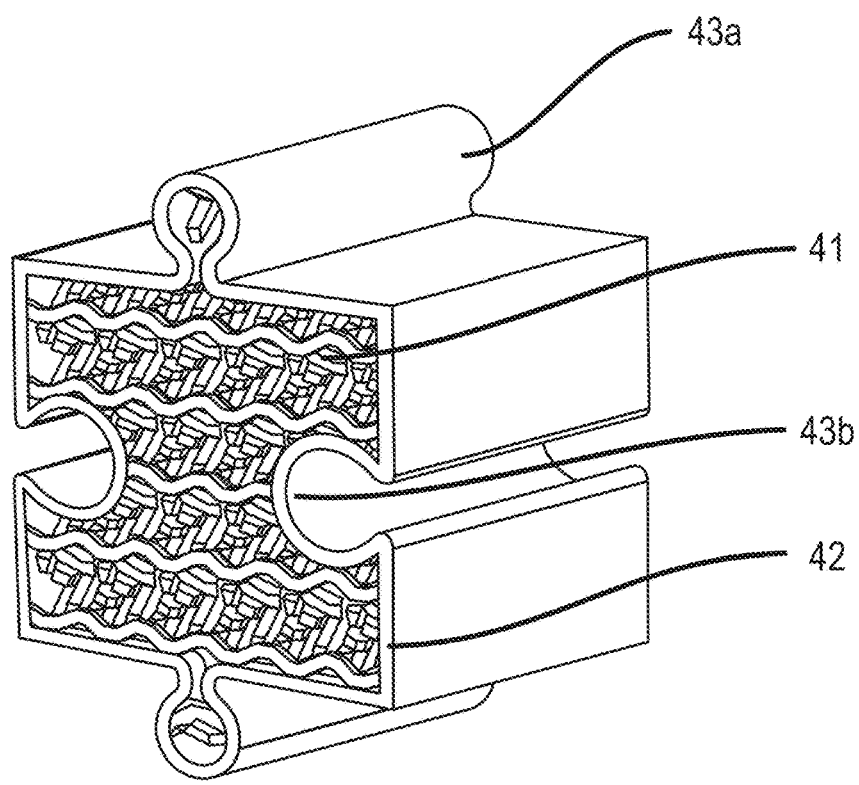
FIG. 4 includes an illustration of a perspective view monolithic ceramic body according to one embodiment.

In FIG. 4, an embodiment is shown wherein the porous structure of the first portion (41) is completely surrounded by the second portion (42), and each side surface includes one complementary engagement structure (43a, and 43b).

Figure 5:
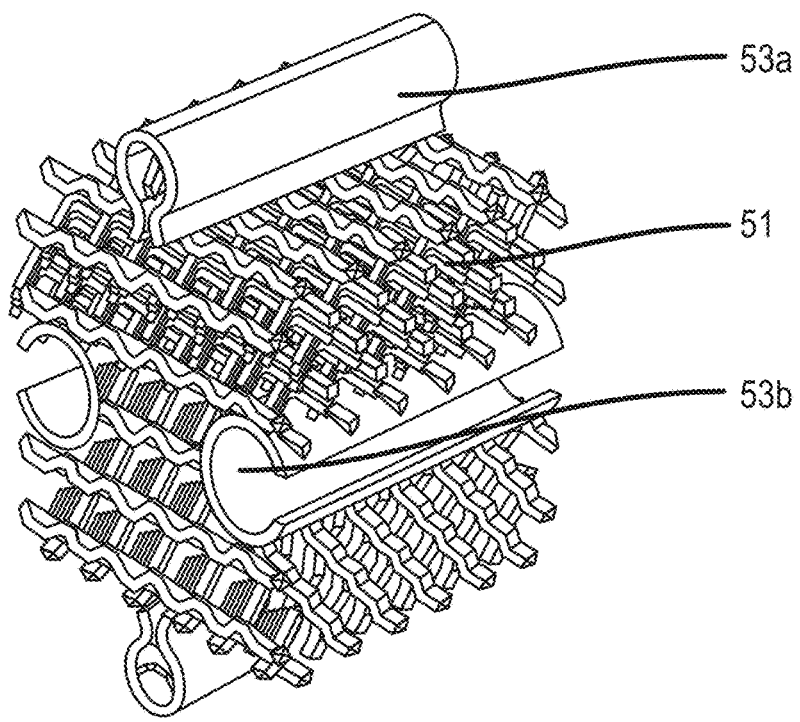
FIG. 5 includes an illustration of a perspective view monolithic ceramic body according to one embodiment.

FIG. 5 shows an embodiment of a monolithic ceramic body, wherein a first portion contains a plurality of interconnected pores (51), and second portions are complementary engagement structures, one on each side surface (53a and 53b).

Figure 7:
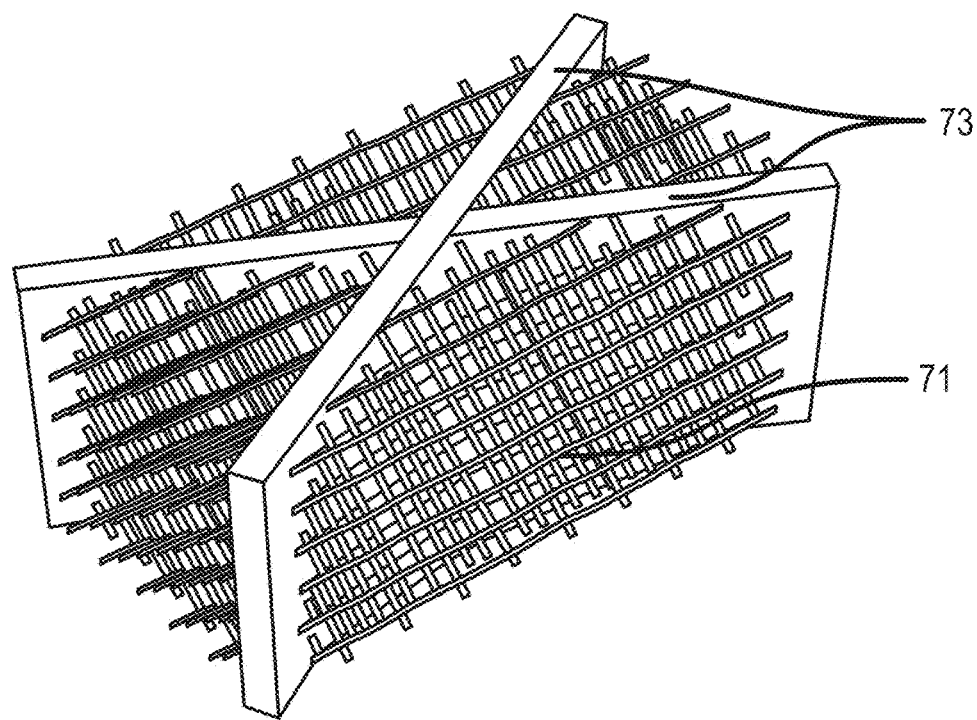
FIG. 7 includes an illustration of a perspective view monolithic ceramic body according to one embodiment.

In another embodiment, the monolithic ceramic body of the present disclosure can contain reinforcing portions integrally formed within the first portion containing a plurality of pores. An example of such an embodiment is illustrated in FIG. 7. In this embodiment, the plurality of pores (71) is stabilized by two diagonally crossing wall structures (73).

Figure 8:
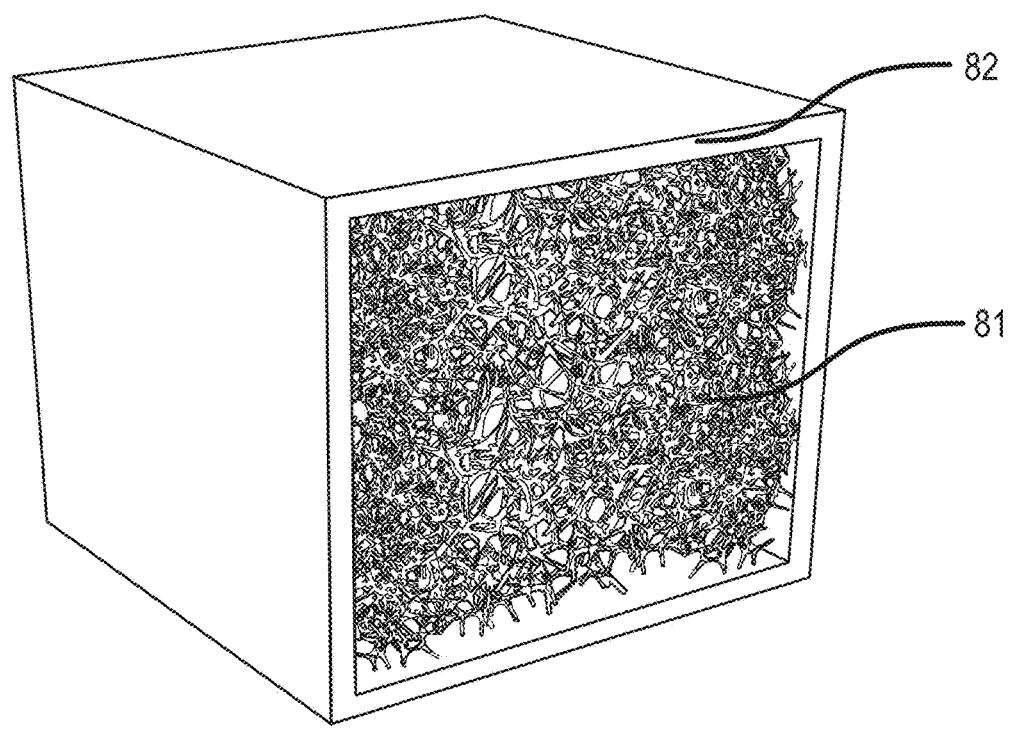
FIG. 8 includes an illustration of a perspective view monolithic ceramic body according to one embodiment.

FIG. 8 shows an embodiment of a monolithic ceramic body, wherein the first portion of a plurality of pores (81) is integrally connected to a second portion in form of a frame (82) surrounding the inner pore structures and thereby can prevent sidewall leakage, for example, during a filtering process.

Figure 6:
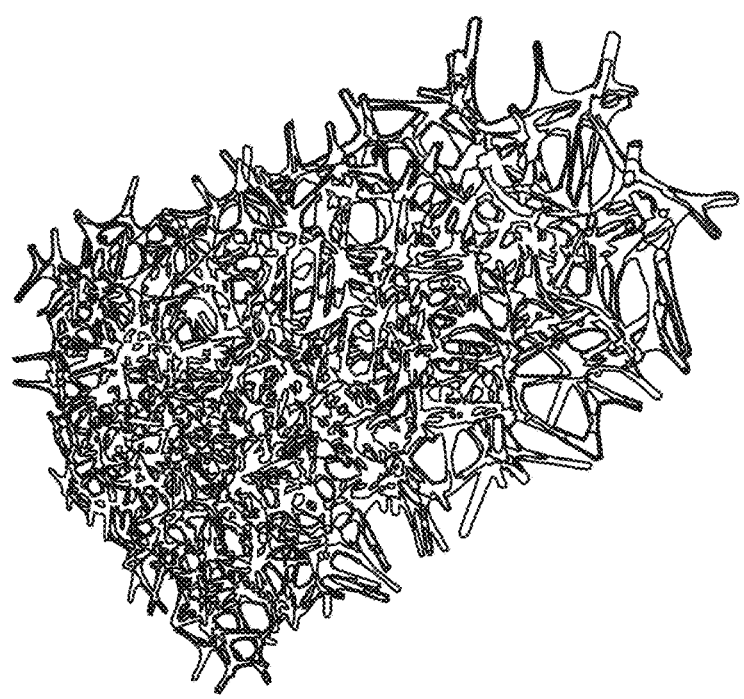
FIG. 6 includes an illustration of a perspective view monolithic ceramic body according to one embodiment.

FIG. 6 is an illustration of monolithic ceramic body having a complex porous structure with a controlled porosity and interconnected pore structure.

Figure 9A:
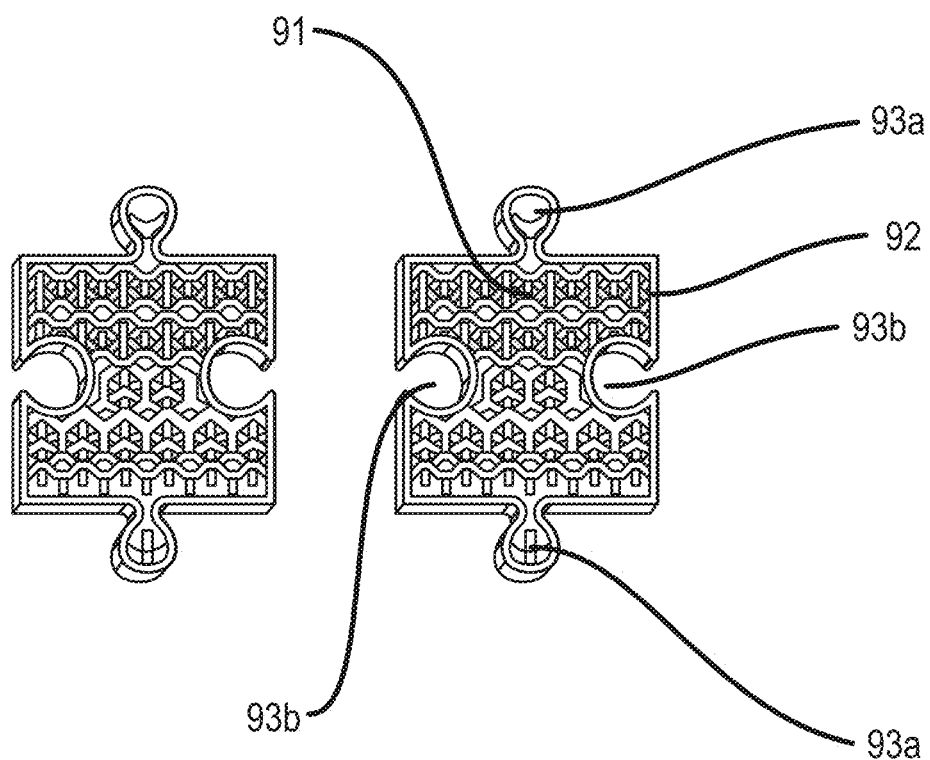
FIG. 9A includes an illustration of a top view of two monolithic ceramic bodies including complementary engagement structures for forming a porous ceramic assembly according to one embodiment.
Figure 9B:
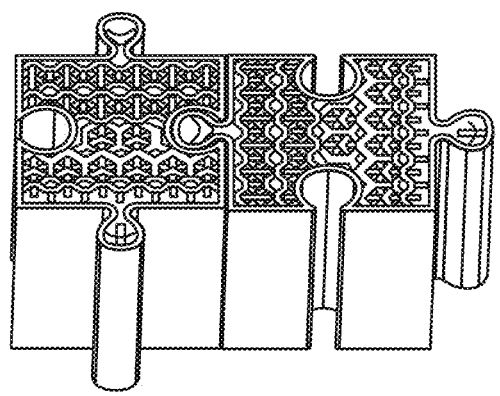
FIG. 9B includes an illustration of a perspective view of a porous ceramic assembly comprising a first monolithic ceramic body and a second monolithic ceramic body coupled to each other according to one embodiment.

In another embodiment, the present disclosure is directed to a porous ceramic assembly, wherein at least two of the above-described monolithic ceramic bodies are coupled to each other via a first complementary engagement structure and a second complementary engagement structure. An illustration of an assembly containing two monolithic ceramic bodies of the present disclosure can be seen if FIGS. 9A and 9B. In FIG. 9A, two monolithic ceramic bodies are shown (a first monolithic ceramic body and a second monolithic ceramic body having the same structure), wherein each side surface contains one complementary engagement structure, two opposite side surfaces having engagement structures being a protrusion (93a), i.e., a first complementary engagement structure, and the other two opposite side surfaces having engagement structures being an indent (93b), i.e., a second complementary engagement structure. FIG. 9B illustrates an embodiment how the two monolithic ceramic bodies of FIG. 9A can be coupled to each other via a first and a second complementary engagement structure.

EMBODIMENTS

Embodiment 1

A monolithic ceramic body comprising: a first portion comprising a plurality of pores defining an interconnected network of pores extending through a portion of the monolithic ceramic body; a second portion integrally formed with the first portion and defining at least a portion of a perimeter surface of the monolithic ceramic body, wherein the second portion includes at least one complementary engagement structure.

Embodiment 2

A monolithic ceramic body comprising: a first portion comprising a plurality of pores defining an interconnected network of pores extending through a portion of the monolithic ceramic body; a second portion integrally formed with the first portion and defining at least a portion of a perimeter surface of the monolithic ceramic body; and wherein the monolithic ceramic body comprises a non-polygonal two-dimensional shape as viewed in a plane defined by a length and width of the body.

Embodiment 3

A monolithic ceramic body comprising: a first portion comprising: a ceramic matrix structure defining a plurality of pores defining an interconnected network of pores extending through the ceramic body; a second reinforcing portion integrally formed with the first portion and extending through the first portion and having at least one dimension of length, width or thickness that is greater than a corresponding dimension of the ceramic matrix.

Embodiment 4

A porous ceramic assembly comprising: at least one first monolithic ceramic body comprising: a first portion comprising a plurality of pores defining an interconnected network of pores extending through a portion of the monolithic ceramic body; and a second portion integrally formed with the first portion and defining at least a portion of a perimeter surface of the monolithic ceramic body, wherein the second portion includes at least one first complementary engagement structure, and at least one second monolithic ceramic body comprising: a second complementary engagement structure, wherein the first monolithic ceramic body and the second monolithic ceramic body are coupled to each other via the at least one first complementary engagement structure and the at least one second complementary engagement structure.

Embodiment 5

The porous ceramic assembly of Embodiment 4, wherein the second monolithic ceramic body comprises a first portion comprising a plurality of pores defining an interconnected network which has a same structure as the plurality of pores of the first portion of the first monolithic ceramic body.

Embodiment 6

The porous ceramic assembly of Embodiment 4, wherein the second monolithic ceramic body comprises a first portion comprising a plurality of pores defining an interconnected network which has a different structure as the plurality of pores of the first portion of the first monolithic ceramic body.

Embodiment 7

The monolithic ceramic body of any of the preceding Embodiments, wherein the plurality of pores of the first portion has an average pore size of at least 20 microns, and a total porosity of the first portion is at least 50 vol %.

Embodiment 8

The monolithic ceramic body of any of the preceding Embodiments, wherein the plurality of pores of the first portion has an average pore size of not greater than 10 cm, and a total porosity of the first portion is at least 50 vol %.

Embodiment 9

The monolithic ceramic body of Embodiment 7, wherein the average pore size of the plurality of pores of the first portion is at least 30 microns, at least 50 microns, at least 100 microns, at least 200 microns, at least 500 microns, at least 800 microns, at least 1000 microns, at least 2000 microns, at least 5000 microns, at least 1 cm, at least 2 cm, or at least 5 cm.

Embodiment 10

The monolithic ceramic body of Embodiment 7, wherein the total porosity of the first portion is at least 55 vol %, at least 60 vol %, at least 70 vol %, at least 80 vol %, at least 85 vol %, or at least 90 vol %.

Embodiment 11

The monolithic ceramic body of Embodiment 7, wherein the total porosity of the first portion is not greater than 99 vol %, such as not greater than 97 vol %, not greater than 95 vol %, not greater than 85 vol %, not greater than 80 vol %, or not greater than 70 vol %.

Embodiment 12

The monolithic ceramic body of any of the preceding Embodiments, wherein a total porosity of the second portion is smaller than a total porosity of the first portion.

Embodiment 13

The monolithic ceramic body of any of the preceding Embodiments, wherein an open porosity of the second portion is a smaller than an open porosity than the first portion.

Embodiment 14

The monolithic ceramic body of any of the preceding Embodiments, wherein the second portion has a total porosity that is smaller than the total porosity of the first portion.

Embodiment 15

The monolithic ceramic body of any of the preceding Embodiments, wherein an average pore size of the second portion is smaller than an average pore size of the first portion.

Embodiment 16

The monolithic ceramic body of any of the preceding Embodiments, wherein a density of the second portion is greater than a density of the first portion.

Embodiment 17

The monolithic ceramic body of any of the preceding Embodiments, wherein the second portion has a porosity of less than 50 vol % and an average pore size of at least 10 nm and not greater than 1 cm.

Embodiment 18

The monolithic ceramic body of Embodiment 17, wherein the average pore size of the second portion is not greater than 0.5 cm, not greater than 0.1 cm, not greater than 500 microns, not greater than 200 microns, not greater than 100 microns, not greater than 50 microns, not greater than 20 microns, not greater than 10 microns, not greater than 1 micron, not greater than 0.5 microns, not greater than 0.3 microns, not greater than 0.1 microns, not greater than 0.05 microns, or not greater than 0.02 microns.

Embodiment 19

The monolithic ceramic body of Embodiment 17, wherein the porosity of the second portion is not greater than 40 vol %, or not greater than 30 vol %, or not greater than 25 vol %, or not greater than 20 vol %, or not greater than 15 vol %, or not greater than 10 vol %, or not greater than 5 vol %, or not greater than 3 vol %.

Embodiment 20

The monolithic ceramic body of any of the preceding Embodiments, wherein the plurality of pores defining an interconnected network comprises at least 80% of the total porosity, or at least at least 85%, or at least 90%, or at least 95%, or at least 96%, or at least 97%, or at least 98%, or at least 99%.

Embodiment 21

The monolithic ceramic body of any of the preceding Embodiments, wherein the plurality of pores has a size variation of not greater than 0.2, wherein the size variation is calculated as (P90−P10)/P50, with P90 being the pore size of 90% of the pores, P10 being the pore size of 10% of the pores, and P50 being the pore size of 50% of the pores.

Embodiment 22

The monolithic ceramic body of any of Embodiments 1 to 20, wherein the plurality of pores of the first portion comprises a size gradient of the average pore size from a first outer surface of the first portion to a second outer surface of the first portion.

Embodiment 23

The monolithic ceramic body of any of Embodiments 1 to 20, wherein the size gradient reduces the average pore size from the first exterior surface to the second exterior surface by at least 20 percent, such as at least 30 percent, at least 40 percent, at least 50 percent and least 60 percent, at least 70 percent, at least 80 percent, or at least 90 percent.

Embodiment 24

The monolithic ceramic body of any of the preceding Embodiments, wherein the ceramic comprises an oxide, a carbide, nitride, boride, or any combination thereof.

Embodiment 25

The monolithic ceramic body of Embodiment 24, wherein the ceramic comprises alumina, silica, cordierite, silicon carbide, zirconia, zircon, tungsten carbide, silicon nitride, hexagonal boron nitride, cubic boron nitride, SiAlON, or any combination thereof.

Embodiment 26

The monolithic ceramic body of any of the preceding Embodiments, wherein the monolithic ceramic body comprises a vitreous material, a polycrystalline material, a monocrystalline material, or a combination thereof.

Embodiment 27

The monolithic ceramic body of any of the preceding Embodiments, wherein the ceramic body is a filter, a catalyst carrier, an insulation material, an electrode material, a guard bed for a reactor, a scaffold for a battery, a material for a fuel cell, or a bio scaffold.

Embodiment 28

The monolithic ceramic body of Embodiment 27, wherein the ceramic body is a filter.

Embodiment 29

The monolithic ceramic body of Embodiment 28, wherein the filter is adapted for molten metal filtration.

Embodiment 30

The monolithic ceramic body of Embodiments 2 or 3, wherein the second portion further comprises at least one complementary engagement structure.

Embodiment 31

The monolithic ceramic body of Embodiments 1 or 30, wherein the at least one complementary engagement structure comprises at least one first complementary engagement structure and at least one second complementary engagement structure.

Embodiment 32

The monolithic ceramic body of Embodiment 31, wherein the at least one first complementary engagement structure includes a depression and the at least one second complementary engagement structure includes a protrusion.

Embodiment 33

The monolithic ceramic body of Embodiments 31 or 32, wherein a shape of the first complementary engagement structure is non-polygonal, and a shape of the second complementary engagement structure is complementary to the shape of the first complementary engagement structure.

Embodiment 34

The monolithic ceramic body of any of Embodiments 1 or 30 to 33, wherein the monolithic ceramic body comprises a rectangular structure, and at least one complementary engagement structure is positioned in a center of a side surface of the monolithic ceramic body throughout a thickness of the body.

Embodiment 35

The monolithic ceramic body of any of Embodiments 1 or 30 to 33, wherein the monolithic ceramic body comprises a rectangular structure, and each of two side surfaces comprises one complementary engagement structure throughout a thickness of the body.

Embodiment 36

The monolithic ceramic body of any of Embodiments 1 or 30 to 33, wherein the monolithic ceramic body comprises a rectangular structure, and each of the four side surfaces comprises a complementary engagement structure throughout a thickness of the body.

Embodiment 37

The monolithic ceramic body of any of Embodiments 1 or 30 to 33, wherein the monolithic ceramic body comprises a round structure, and at least one complementary engagement structure is positioned at a circumference of the monolithic ceramic body throughout a thickness of the body.

Embodiment 38

A process for preparing a monolithic ceramic body, comprising: forming a monolithic green body by an additive manufacturing process, wherein the green body comprises ceramic particles and a binder; removing the binder of the green body by heat treatment; and sintering the green body at a temperature of at least 700° C. to obtain the ceramic body, wherein the ceramic body comprises a first portion comprising a plurality of pores defining an interconnected network of pores; a second portion integrally formed with the first portion and defining at least a portion of a perimeter surface of the monolithic ceramic body, wherein the second portion includes at least one complementary engagement structure.

Embodiment 39

The process of Embodiment 38, wherein the additive manufacturing process is a powder based three-dimensional printing process comprising in alternating order: forming a ceramic powder layer, and selectively printing a liquid binder on top of the powder layer.

Embodiment 40

The process of Embodiment 39, wherein the ceramic powder comprises an oxide, a carbide, a nitride, a boride, or any combination thereof.

Embodiment 41

The process of Embodiment 40, wherein the ceramic powder comprises alumina, silica, cordierite, silicon carbide, zirconia, zircon, tungsten carbide, silicon nitride, hexagonal boron nitride, cubic boron nitride, SiAlON, or any combination thereof.

EXAMPLES

The following non-limiting examples illustrate the present invention.

Example 1

Additive manufacturing of a three-dimensional cordierite body.

A green body made of cordierite particles and a binder was printed via a binder jetting process, using an Innovent 3D printer from ExOne. The powder material used for the binder jetting printing was a cordierite powder having an average particle size of 20 microns. The liquid binder BA005 was a proprietary product of the printer manufacturer.

The digital image of the CAD model provided to the printer can be seen in FIG. 4. The interconnected pore structure 41 had an average inner pore size diameter of about 1000 microns. The printing was conducted by repeating of rolling down a thin layer of the ceramic powder and subsequently jetting liquid binder to selected places of the powder layer corresponding to the digital image provided to the printer. The steps of forming a powder layer followed by binder jetting were repeated until the complete green body was formed.

After the green body was printed, the entire build volume was placed for four hours in a drying oven having a temperature of 180° C. to fully cure the binder. Thereafter, any loose powder which was not saturated with binder was removed from the green body with compressed air. An image of the depowdered green body (101) can be seen in FIG. 10A.

After depowdering, the green body was heated at a speed of 5° C./min up to 600° C. and held for 30 minutes at 600° C. to remove the binder. Thereafter, the debinded body was sintered by further increasing the temperature at a speed of 5° C./min up to 1300° C., held for 6 hours at the maximum sintering temperature, and cooled down at a speed of 5° C./min.

Figure 10A:
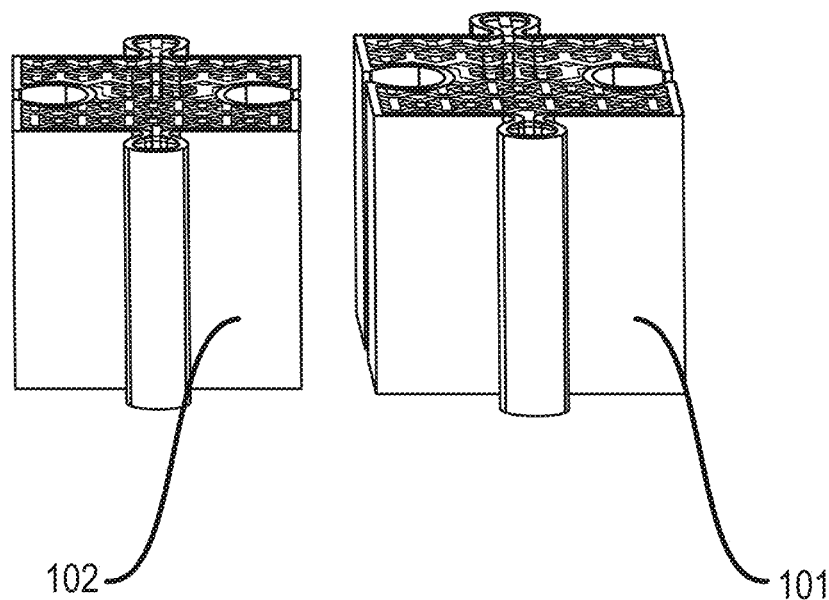
FIG. 10A includes a perspective side image of the monolithic ceramic body (left) obtained in Example 1 and of the corresponding green body (right) according to one embodiment.
Figure 10B:
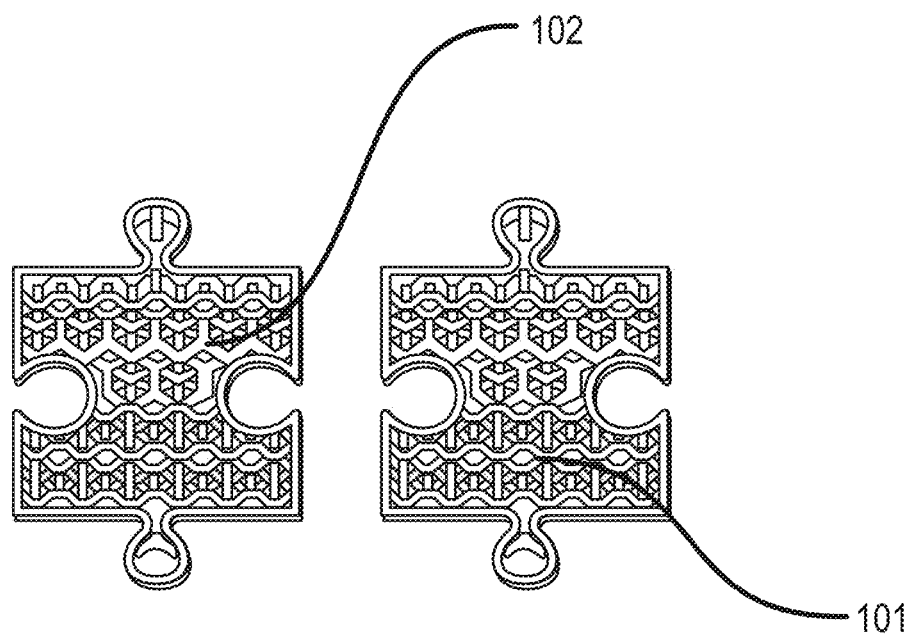
FIG. 10B includes a top image of the monolithic ceramic body (left) obtained in Example 1 and of the corresponding green body (right) according to one embodiment.

FIG. 10A shows a perspective image of the green body (101) next to the corresponding monolithic ceramic body obtained after sintering (102). FIG. 10B is an image showing the top views of the green body (101) and the sintered body (102) of Example 1. It can be seen that after sintering, the obtained ceramic body was subjected to some shrinkage in comparison to the green body. The inner pore diameter of the plurality of pores in the sintered body was about 1000 microns and all pores of this dimension were interconnected and open.

Example 2

Additive manufacturing of vitrified alumina body.

A green body was printed using a powder mixture of alumina and glass. The binder and the 3D printing machine were the same as in Example 1.

The digital image provided to the printer was a round body having a diameter of 50 mm, a solid region of 1 mm thickness framing at the outer circumference of the filter (second portion), while the center part (first portion) of the body contained interconnected pores having a diameter of 1000 microns in a random orientation.

After curing the binder at 180° C., removing any loose powder, and heat treatment at 600° C. to remove the binder (all conducted the same way as in Example 1), the debinded body was sintered by increasing the temperature up to 915° C., remaining for 8 hours at 915° C., followed by free cooling until room temperature.

Figure 11A:
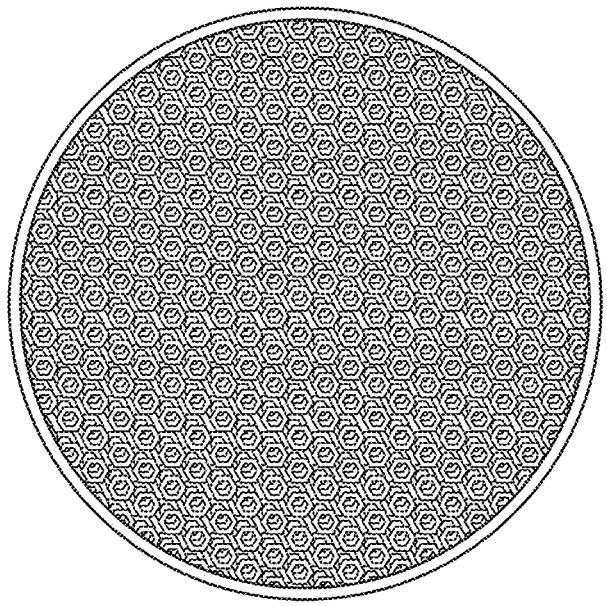
FIG. 11A includes a top view image of a monolithic ceramic body according to one embodiment.
Figure 11B:
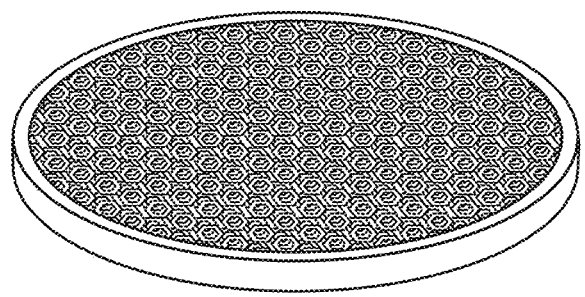
FIG. 11B includes a perspective side view image of the monolithic ceramic body shown in FIG. 11A according to one embodiment.

FIGS. 11A and 11B show images of the top view and a perspective side view of the sintered filter. The measured inner pore diameter ranged from 750 microns to 1250 microns, and all pores of this dimension were interconnected and open. The sintered body was very similar to the original digital image in size and shape.

Example 3

Additive manufacturing of vitrified alumina body containing reinforcing portions.

Figure 12A:
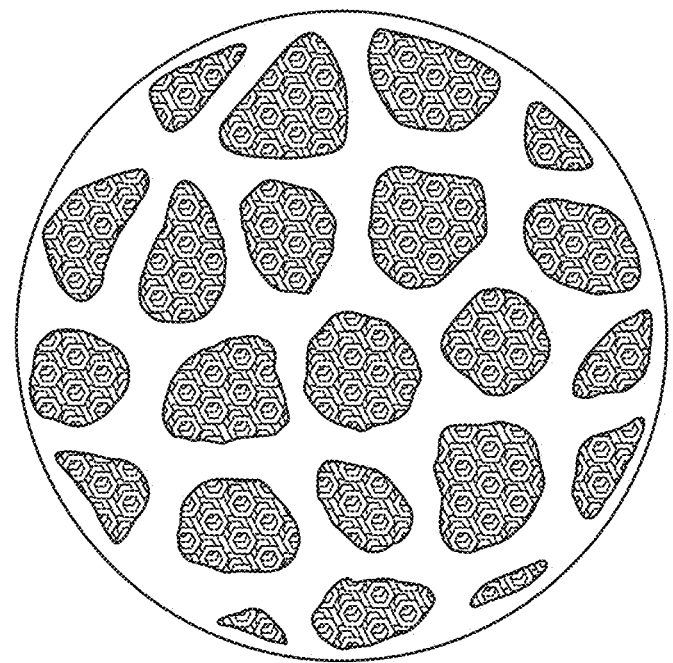
FIG. 12A includes top view image of a monolithic ceramic body according to one embodiment.
Figure 12B:
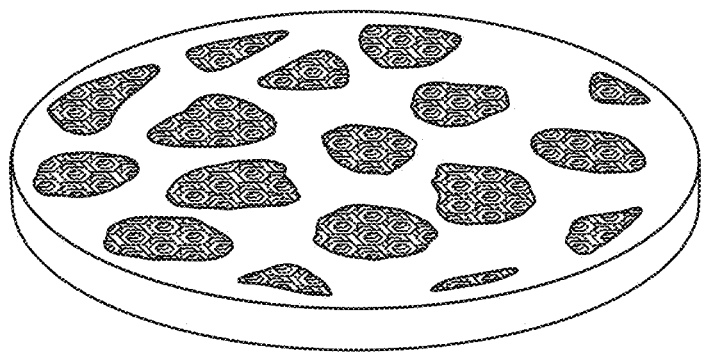
FIG. 12B includes a perspective side view image of the monolithic ceramic body shown in FIG. 12A according to one embodiment.

A round green body was printed having the same diameter size and using the same material and printing process as described in Example 2, except that the digital image provided to the printer contained between areas of plurality of pores dense areas which do not allow the passing of a liquid, and have the function to provide more stability to the filter. FIGS. 12A and 12B provide a top view and a side view of the sintered filter. The pore structure of this ceramic body was of random orientation with pore sizes ranging from 750 microns to 1250 microns. All pores of this dimension were interconnected and open. The ceramic body was very similar to the original digital image in size and shape.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A monolithic ceramic body comprising:
    a first portion comprising a plurality of pores defining an interconnected network extending through a portion of the monolithic ceramic body, wherein the plurality of pores of the first portion consists of a network of interconnected, randomly oriented pores; and
    a second portion integrally formed with the first portion and defining at least a portion of a perimeter surface of the monolithic ceramic body, wherein an average pore size of the second portion is smaller than an average pore size of the first portion and the second portion has a porosity of less than 50 vol %;
    wherein the monolithic ceramic body comprises at least one first complementary engagement structure having a first shape defining a protrusion, the protrusion comprising at least a portion of the first portion and at least a portion of the second portion, and at least one second complementary engagement structure having a second shape defining an indent that extends into the first portion and has a surface that is at least partially defined by the second portion;
    and wherein the first shape and the second shape are complementary to each other.

2. The monolithic ceramic body of claim 1, wherein the plurality of pores of the first portion has an average pore size of at least 30 microns, and a total porosity of the first portion is at least 50 vol %.

3. The monolithic ceramic body of claim 2, wherein the plurality of pores of the first portion has an average pore size of at least 500 microns.

4. The monolithic ceramic body of claim 1, wherein a total porosity of the plurality of pores of the first portion defining an interconnected network comprises at least 80%.

5. The monolithic ceramic body of claim 1, wherein the plurality of pores of the first portion comprises a size gradient of the average pore size from a first outer surface of the first portion to a second outer surface of the first portion, wherein the size gradient reduces the average pore size from the first outer surface to the second outer surface by at least 20 percent.

6. The monolithic ceramic body of claim 1, wherein the ceramic comprises an oxide, a carbide, nitride, boride, or any combination thereof.

7. The monolithic ceramic body of claim 6, wherein the ceramic comprises alumina, silica, cordierite, silicon carbide, zirconia, zircon, tungsten carbide, silicon nitride, boron nitride, cubic boron nitride, SiAlON, or any combination thereof.

8. The monolithic ceramic body of claim 1, wherein the ceramic body is a filter, a catalyst carrier, an insulation material, an electrode material, a guard bed for a reactor, a scaffold for a battery, a material for a fuel cell, or a bio scaffold.

9. The monolithic ceramic body of claim 1, wherein the shape of the at least one first complementary engagement structure is non-polygonal, and the shape of the at least one second complementary engagement structure is non-polygonal.

10. The monolithic ceramic body of claim 1, wherein the monolithic ceramic body comprises a rectangular structure, and the at least one complementary engagement structure is positioned in a center of a side surface of the monolithic ceramic body throughout a thickness of the body.

11. The monolithic ceramic body of claim 1, wherein the monolithic ceramic body comprises a rectangular structure, and the first complementary engagement structure is positioned in a center of a side surface of the body throughout a thickness of the body, and the second complementary engagement structure is positioned in a center of another side surface of the body throughout a thickness of the body.

12. An assembly comprising at least two of the monolithic ceramic bodies of claim 1, wherein the at least two monolithic ceramic bodies are directly coupled via a first complementary engagement structure of one monolithic ceramic body of the assembly to a second complementary engagement structure of another monolithic ceramic body of the assembly.

13. The porous ceramic body of claim 1, wherein the second portion comprises a plurality of pores having an average pore size not greater than 50 microns.

14. The monolithic ceramic body of claim 1, wherein a thickness of the second portion is even throughout a circumference of the monolithic body.

15. The monolithic ceramic body of claim 1, wherein the monolithic ceramic body is formed by an additive manufacturing process.

16. The monolithic ceramic body of claim 1, wherein the monolithic ceramic body is adapted for molten metal filtration.

* * * * *